United States Patent
Dinh et al.

(10) Patent No.: US 10,970,161 B2
(45) Date of Patent: Apr. 6, 2021

(54) TIME SERIES FORECASTING CLASSIFICATION

(71) Applicant: EMC IP Holding Company LLC, Hopkinton, MA (US)

(72) Inventors: Hung Dinh, Austin, TX (US); Reddeppa Kollu, Leander, TX (US); Venkat Allaka, Cedar Park, TX (US); Sabu Syed, Austin, TX (US); Jyothi K R, Bangalore (IN); Anu Bala Thakur, Chandigarh (IN); Madhusudhana Reddy Chilipi, Leander, TX (US); Chakradhar Kommana, Cedar Park, TX (US); Tousif Mohammed, Bangalore (IN); Vinod Kumar, Bangalore (IN); Manikandan Pammal Rathinavelu, Cedar Park, TX (US); Abhishek Joshi, Telengana (IN); John K. Maxi, New Orleans, LA (US); Jatin Kamlesh Thakkar, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 111 days.

(21) Appl. No.: 16/265,327

(22) Filed: Feb. 1, 2019

(65) Prior Publication Data
US 2020/0250027 A1    Aug. 6, 2020

(51) Int. Cl.
*G06F 11/07*    (2006.01)
*G06F 11/14*    (2006.01)
(Continued)

(52) U.S. Cl.
CPC ........ *G06F 11/0793* (2013.01); *G06F 11/008* (2013.01); *G06F 11/1438* (2013.01);
(Continued)

(58) Field of Classification Search
CPC .............. G06F 11/0793; G06F 11/008; G06F 11/1438; G06F 11/3419; G06F 11/3452; G06N 20/00
See application file for complete search history.

(56) References Cited

U.S. PATENT DOCUMENTS

| | | | |
|---|---|---|---|
| 10,198,339 B2* | 2/2019 | Salunke | G06F 11/34 |
| 2004/0088406 A1* | 5/2004 | Corley | H04L 41/064 |
| | | | 709/224 |

(Continued)

*Primary Examiner* — Matthew M Kim
*Assistant Examiner* — Indranil Chowdhury
(74) *Attorney, Agent, or Firm* — Daly, Crowley Mofford & Durkee, LLP

(57) ABSTRACT

A method is disclosed including: obtaining one or more values of a system metric, the system metric being associated with a hardware resource of a computing device; detecting whether the system metric is approaching a threshold, the threshold being associated with a key performance indicator (KPI) of the computing device, the detecting being performed based on the obtained values of the system metric; calculating a predicted value of the system metric in response to detecting that the system metric is approaching the threshold, the predicted value of the system metric being calculated by using a linear predictor that is trained using unevenly-sampled training data; detecting whether the predicted value of the system metric exceeds the threshold; and reconfiguring the computing device to prevent the system metric from reaching the predicted value in response to detecting that the predicted value exceeds the threshold.

20 Claims, 6 Drawing Sheets

(51) Int. Cl.
*G06F 11/34* (2006.01)
*G06F 11/00* (2006.01)
*G06N 20/00* (2019.01)

(52) U.S. Cl.
CPC ...... *G06F 11/3419* (2013.01); *G06F 11/3452* (2013.01); *G06N 20/00* (2019.01); *G06F 2201/81* (2013.01)

(56) References Cited

U.S. PATENT DOCUMENTS

| | | | |
|---|---|---|---|
| 2012/0209568 A1* | 8/2012 | Arndt | G06F 11/3089 |
| | | | 702/183 |
| 2016/0285700 A1* | 9/2016 | Gopalakrishnan | G06N 7/005 |
| 2017/0364819 A1* | 12/2017 | Yang | H04L 41/0636 |
| 2018/0081912 A1* | 3/2018 | Suleiman | G06N 20/20 |
| 2018/0365582 A1* | 12/2018 | Musuvathi | G06N 20/00 |
| 2019/0159048 A1* | 5/2019 | Feldkamp | H04W 24/08 |

\* cited by examiner

700

TIME SERIES FORECASTING CLASSIFICATION

BACKGROUND

Enterprise systems may include severs, storage, and associated software that are typically maintained by business organizations in support of their operations. Enterprise systems are designed to offer high level of performance to satisfy the operational needs of business organizations. The reliable operation of enterprise systems is of upmost importance, as any failure in an enterprise system may disrupt the operations of the business organization which it serves. Accordingly, the need exists for improved system management techniques for ensuring the reliable operation of enterprise systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is disclosed comprising: obtaining one or more values of a system metric, the system metric being associated with a hardware resource of a computing device; detecting whether the system metric is approaching a threshold, the threshold being associated with a key performance indicator (KPI) of the computing device, the detecting being performed based on the obtained values of the system metric; calculating a predicted value of the system metric in response to detecting that the system metric is approaching the threshold, the predicted value of the system metric being calculated by using a linear predictor that is trained using unevenly sampled training data; detecting whether the predicted value of the system metric exceeds the threshold; and reconfiguring the computing device to prevent the system metric from reaching the predicted value in response to detecting that the predicted value exceeds the threshold.

According to aspects of the disclosure, a system is disclosed comprising: a memory; and at least one processor operatively coupled to the memory, the at least one processor being configured to perform the operations of: obtaining one or more values of a system metric, the system metric being associated with a hardware resource of a computing device; detecting whether the system metric is approaching a threshold, the threshold being associated with a key performance indicator (KPI) of the computing device, the detecting being performed based on the obtained values of the system metric; calculating a predicted value of the system metric in response to detecting that the system metric is approaching the threshold, the predicted value of the system metric being calculated by using a linear predictor that is trained using unevenly-sampled training data; detecting whether the predicted value of the system metric exceeds the threshold; and reconfiguring the computing device to prevent the system metric from reaching the predicted value in response to detecting that the predicted value exceeds the threshold.

According to aspects of the disclosure, a non-transitory computer-readable medium storing one or more processor-executable instructions which when executed by at least one processor cause the at least one processor to perform the operations of: obtaining one or more values of a system metric, the system metric being associated with a hardware resource of a computing device; detecting whether the system metric is approaching a threshold, the threshold being associated with a key performance indicator (KPI) of the computing device, the detecting being performed based on the obtained values of the system metric; calculating a predicted value of the system metric in response to detecting that the system metric is approaching the threshold, the predicted value of the system metric being calculated by using a linear predictor that is trained using unevenly-sampled training data; detecting whether the predicted value of the system metric exceeds the threshold; and reconfiguring the computing device to prevent the system metric from reaching the predicted value in response to detecting that the predicted value exceeds the threshold.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1A:
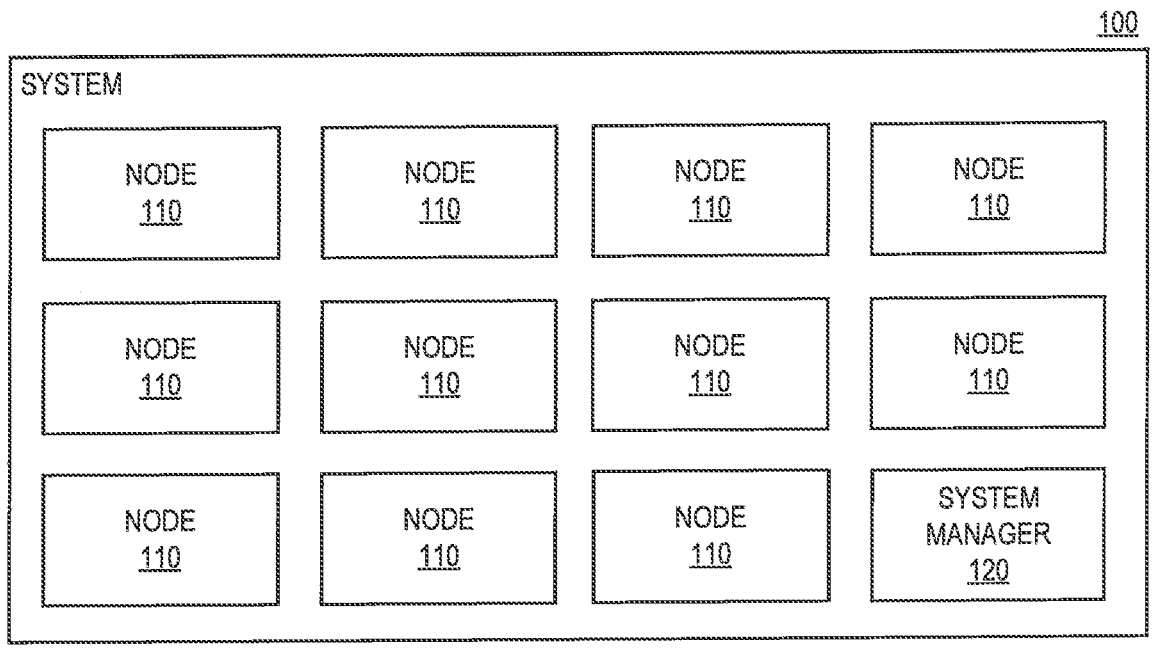
FIG. 1A is a diagram of an example of a system, according to aspects of the disclosure.

FIG. 1A is a diagram of an example of a system 100, according to aspects of the disclosure. The system 100 may include a plurality of nodes 110 and a system manager 120 that are operatively coupled to one another. In some implementations, the nodes 110 and the system manager 120 may be coupled to one another via a communications network (not shown). The communications network may include one or more of the Internet, an enterprise network, a wide-area network (WAN), a local-area network (LAN), a TCP/P network, an InfiniBand network, and/or any other suitable type of network.

The present disclosure is not limited to any specific implementation of the nodes 110 and the system manager 120. In some implementations, any of the nodes 110 and the system manager 120 may include a respective computing device, such as the computing device 700, which is discussed further below with respect to FIG. 7. Additionally or alternatively, in some implementations, any of the nodes 110 and the system manager 120 may be implemented as a hypervisor that is executed on a computing device, such as the computing device 700. Additionally or alternatively, in some implementations, any of the nodes 110 and the system manager 120 may be implemented as a virtual machine that is executed on a computing device, such as the computing device 700. Additionally or alternatively, in some implementations, any of the nodes 110 and the system manager 120 may be implemented as a service that is executed on a computing device, such as the computing device 700.

The system manager 120 may be configured to monitor the state of any of the nodes 110 in the system 100 and proactively reconfigure the node 110 to prevent it from entering an undesired state. For example, an undesired state of a node may be one in which the response time of the node falls below a threshold. The response time of the node may include the time it takes the node to perform a particular operation, such as a data retrieve operation, a data store operation, a data render operation, a calculation, etc. Additionally or alternatively, in some implementations an undesired state of a node may include a state in which the node is unresponsive or unable to fulfill one or more of its functions. Stated succinctly, the present disclosure is not limited to any specific type of undesired state.

Reconfiguring a node may include any suitable remediation action that causes the node to transition from a first state to a second state. In some implementations, the remediation action may include one or more of restarting the node, terminating one or more processes or services that are executed on the node, changing a configuration setting of the node, deleting data that is stored in the node, copying data that is stored in the node to another device, and/or changing the state of the node in any other suitable manner. In some implementations, the system manager 120 may reconfigure any of the nodes 110 by transmitting a message to the node, which when received by the node causes the node to transition from one state to another. The message may be transmitted over a communications network, a communications bus (that is implemented using the communications network), and/or in any other suitable manner. In this regard, it will be understood that the present disclosure is not limited to any specific process for remotely reconfiguring the nodes 110 by the system manager 120.

The operation of the system manager 120 is discussed further below with respect to FIGS. 1B-7. Although in the present example the system manager 1211 is depicted as a monolithic device, it will be understood that in some implementations the system manager 120 may include a plurality of devices that are operatively coupled to one another and configured to perform together the functions ascribed to the system manager 120 throughout the present disclosure. Stated succinctly, the present disclosure is not limited to any specific implementation of the system manager 120.

In some implementations, the system manager 120 may be configured to provide (at least in part) an Enterprise Integration Services Remediation (EISR) service. The EISR service may be an event-driven autonomous workflow, in which the system manager 120 is configured to monitor for certain events and is triggered to perform actions autonomously when a threshold is met. In some implementations, the EISR service may include loosely coupled service components that communicate over a message bus, and can be scaled horizontally. In some implementations, the execution of the EISR service may be triggered from monitoring software that is executed on the system 100, such as Splunk. Several examples of the operation of the EISR service are provided further below.

Disk space utilization can be one of the major concerns in the system 100, as major outages can take place in any computing system when disk space becomes depleted. To prevent such outages, OS watchers executed in any of the nodes 110 may feed machine level stats and server logs to monitoring software (e.g., Splunk) that is executed in the system 100. Based on the stats and server logs, the monitoring software may detect when any of the nodes 110 begins to run low on storage space and trigger an alert to the EISR service. The EISR service may then validate the alert accuracy and take remediation steps, as necessary. As noted above, the remediation steps may include cleaning/archiving logs, moving data to other locations to free space, etc. In some implementations, the alert validation and remediation steps may be performed by executing the process 200, which is discussed further below with respect to FIG. 2.

Heap memory usage may also be an important concern in the system 100, as the excessive consumption of heap memory space can lead to a decrease in system performance. In this regard, the EISR may be configured to detect when the heap memory usage in any of the nodes 110 is expected to exceed a threshold, and take remediation actions to prevent the threshold from being exceeded. Such actions may include performing heap dumps in one or more of the nodes 110 and/or collecting the heap dumps on different managed servers. In some implementations, the detection and remediation of excessive heap usage may be performed by executing the process 200, which is discussed further below with respect to FIG. 2.

High usage random-access memory (RAM) may also be an important concern in the system 100. High RAM usage may occur when an excessive number of threads is executed in any of the nodes 110. When an excessive number of threads is executed on the nodes 110, the node 110 may freeze as a result of any of its threads becoming stuck (e.g., due to a deadlock). In this regard, the EISR may be configured to detect when the RAM usage in any of the nodes 110 is expected to exceed a threshold, and take remediation actions to prevent the threshold from being exceeded. Such actions may include performing restarting any of the nodes 110 before they have become stuck. In some implementations, the detection and remediation of excessive RAM usage may be performed by executing the process 200, which is discussed further below with respect to FIG. 2.

Figure 1B:
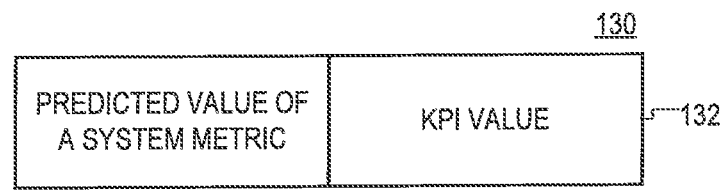
FIG. 1B is a diagram of an example of data structures used by the system of FIG. 1A, according to aspects of the disclosure.
Figure 1B:
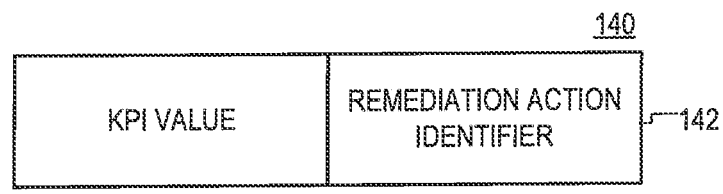

FIG. 1B shows an example of mapping structures 130 and 140 that are utilized by the system manager 120. Each of the mapping structures may be stored in a memory of the system manager 120 and/or in another node in the system 100. Although in the present example the mapping structures 130 and 140) are depicted as being independent, it will be understood that alternative implementations are possible in which the mapping structures are integrated together.

The mapping structure 130 may include one or more entries 132. Each entry 132 may map at least one value of a system metric that is associated with a hardware resource of a node in the system 100 to a value of a key performance indicator (KPI) associated with the node. The hardware resource may include any suitable hardware component (e.g., physical or virtual) of the node, such as a processor, processor cache, RAM, non-volatile memory, a network adapter, a power supply, one or more input devices, one or more output devices, etc. In some implementations, any system metric that is associated with a hardware resource may identify a utilization rate of the hardware resource, and/or any other suitable characteristic of the operation of the hardware resource. In some implementations, any KPI associated with a node may identify a characteristic of the operation of software that is executed on the node. For example, a KPI that is associated with a node may include a count of threads executed on the node, and/or response time of one or more services executed on the node. Stated succinctly, any KPI that is associated with a node may correspond to a particular state of the node, and it may identify how efficiently, or correctly, the node is performing its functions. The present disclosure is not limited to any specific type of KPI being identified in the mapping structure 130.

The mapping structure 140 may include one or more entries 142. Each entry 142 may map an undesired state of a node in the system 100 to one or more remediation action identifiers. Each undesired state of the node may be represented by the values of one or more KPIs of the node. Each remediation action identifier may include any number or string that identifies an action, which when taken by the system manager 120 and/or the node, will steer the node away from the undesired state. In some implementations, the mapping structures 130 and 140 may be generated by the system manager 120 by using a machine learning (ML) model that is configured to detect associations between system metric values and the values of corresponding KPIs of the node.

The system manager 120 may use the mapping structures 130 and 140 to prevent any of the nodes 110 from entering an undesired state. In operation, the system manager 120 may calculate a predicted value for a system metric of the node. Next, the system manager 120 may search the mapping structure 130 based on the predicted value to determine one or more KPI values that are associated with the predicted value of the system metric, which represent an undesired state. Next, the system manager 120 may search the mapping structure 140 to identify one or more remediation actions that correspond to the determined KPI values. And finally, the system manager 120 may reconfigure the node by executing the identified remediation actions. Although in the present example, the predicted system metrics are indirectly mapped to remediation actions, by the mapping structures 130 and 140, alternative implementations are possible in which the predicted system metrics are mapped directly to corresponding remediation actions. In such implementations, a single data structure can be used that maps respective remediation actions to predicted values of system metrics.

Figure 1C:
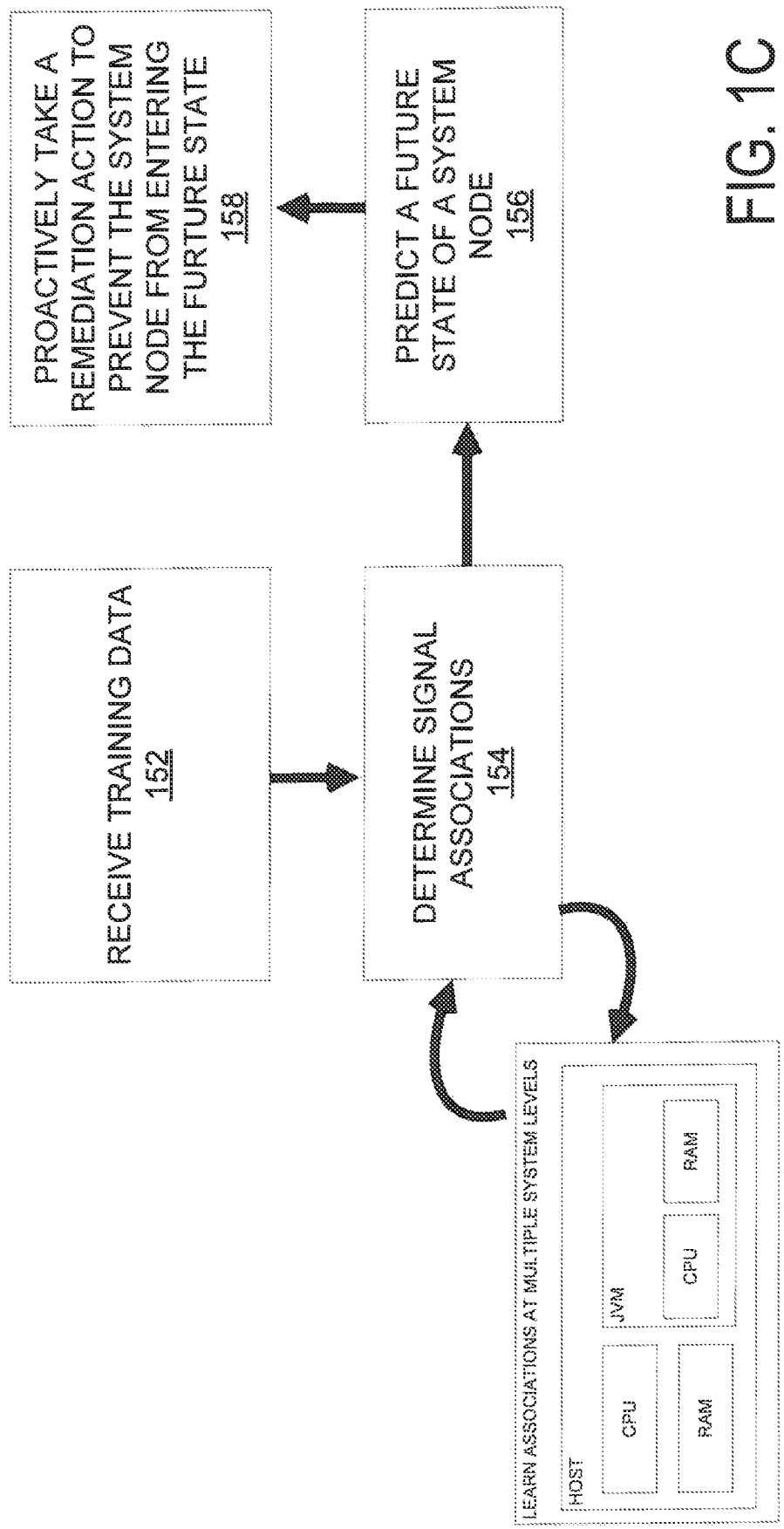
FIG. 1C is a diagram illustrating aspects of the operation of the system of FIG. 1A, according to aspects of the disclosure.

FIG. 1C is a diagram of illustrating aspects of the operation of the system manager 120. At stage 152, input data associated with one or more nodes 110 is obtained. At stage 154, a machine learning model (e.g., a neural network, a Bayesian network, etc.) that is executed based on the input data to generate associations between signals within the system 100 and states of the one or more nodes. At step 156, a future (undesired) state of one of the nodes 110 is predicted based on the set of associations. As discussed above with respect to FIG. 1-B, predicting the future state of a node may include calculating a predicted value of a system metric of the node. The predicted value may be calculated by using a linear predictor, as discussed further below with respect to FIGS. 2 and 4. At step 158, a remediation action is proactively taken by the system manager 120 to prevent the node 110 from entering the future state.

As noted above with respect to FIGS. 1A-B, in some implementations, the remediation action may include automatically reconfiguring the node. Additionally or alternatively, in some implementations, the remediation action may include outputting a notification message identifying the future state and/or the reason for which the node is expected to enter the future state. The notification message may be presented to a system administrator, which can then manually reconfigure the node. Outputting the notification message may include rendering the notification message on an output device (e.g., a display screen or audio speaker) and/or transmitting the notification message over a communications network to an administrator terminal.

According to aspects of the disclosure, any of the associations between signals within the system 100 and the state of one or more nodes may include one or more data structures that are configured to map each of a plurality of values of a system metric to a different respective value of a KPI associated with the system metric. In some implementations, the associations may be built at multiple system levels. For instance, when a node is a computing device executing a virtual machine: (i) one or more associations may be generated between a KPI of the node and CPU (and/or RAM) utilization of the entire computing device, and (ii) one or more associations between a KPI of the node and or virtual CPU (or virtual RAM) that is allocated to the virtual machine. Any of the associations determined at stage 154 may be used to populate data structures, such as the mapping structures 130 and 140 or calculate a threshold that is used by the system manager 120 to determine whether any of the nodes 110 in the system 100 needs to be reconfigured. An example of an association that can be determined at stage 154 is discussed further below with respect to FIG. 3.

Figure 2:
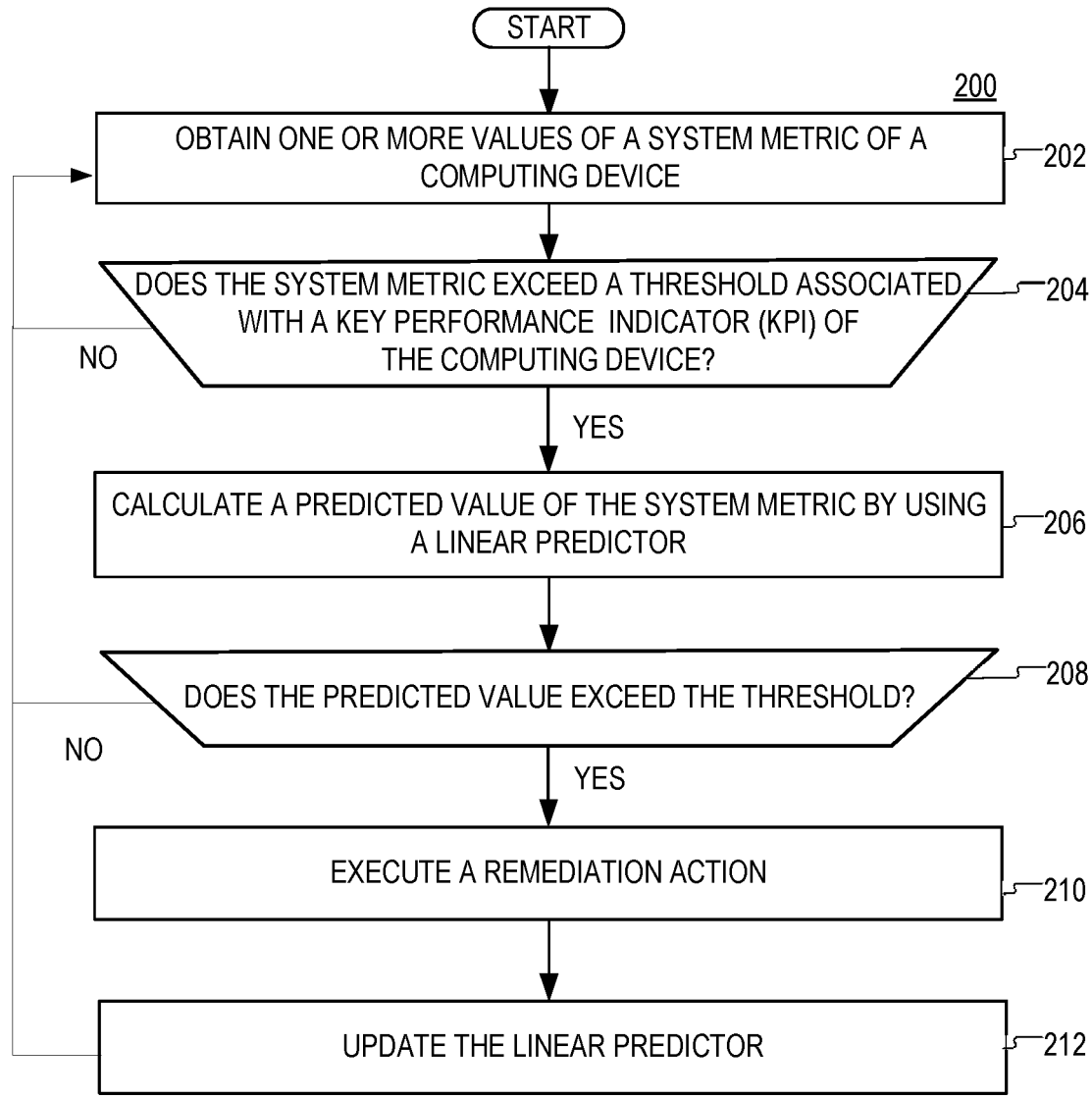
FIG. 2 is a flowchart of an example of a process, according to aspects of the disclosure.

FIG. 2 is a flowchart of an example of a process 200 that is performed by the system manager 120, according to aspects of the disclosure.

At step 202, one or more values of a system metric of a node 110 (hereinafter "subject node") in the system 100 are obtained. In some implementations, the one or more values may be obtained from a system log that is generated by the subject node 110 and/or stored in a memory of the subject node. The system metric may be the same or similar to any of the system metrics discussed above with respect to FIGS. 1A-C. In some implementations, the system metric may include CPU or RAM utilization rate.

At step 204, a determination is made if the system metric approaches a predetermined threshold that is associated with one or more KPIs of the subject node. In some implementations, before step 204 is executed, the threshold associated with the KPI of the subject node may be calculated by the system manager 120, as discussed further below with respect to FIG. 3. According to aspects of the disclosure, a system metric may approach the threshold if one or more of its values are within a predetermined distance from the threshold. Additionally or alternatively, in some implementations, a system metric may approach the threshold if it increases or decreases in the direction of the threshold. Stated succinctly, in some implementations, whether the system metric approaches the threshold may be determined based on at least one of (i) one or more values of the system metric, and (ii) rate of change of the system metric. If the system metric is determined to approach the threshold, the process 200 proceeds to step 206. Otherwise, the process 200 returns to step 202.

At step 206, a predicted value of the system metric is calculated. In some implementations, the predicted value may be a value which the system metric is expected to have at a time instant in the future. Additionally or alternatively, the predicted value may be either an average or mean value of the system metric during a future time period. The predicted value may be calculated using a linear predictor model. The linear predictor model may be trained as discussed further below with respect to FIG. 4.

According to the present example, the predicted value is calculated by using a Stochastic Gradient Descent (SGD) model. The SGD model may be an implementation of a linear predictor model that supports large-scale and online machine learning. The SGD model may be configured to compute the optimal weights for each feature of the data obtained at step 202 by incrementally computing the derivative of the loss function on a small number of (or single) observations of training data. This allows the model parameters to be updated as new data is obtained, without the need for retraining the model from scratch. In some implementations, the stochastic gradient model may be expressed using Equations 1 and 2 below:

$$Q(w) = \frac{1}{n}\sum_{i=1}^{n} Q_i(w), \quad \text{(Eq. 1)}$$

$$w := w - \eta \nabla Q_i(w), \quad \text{(Eq. 2)}$$

in which the model error Q is a function of weights w for each model parameter. The parameter weights w are updated with respect to the gradient of the parameters' loss.

At step 208, a determination is made if the expected value of the system metric exceeds the threshold associated with a KPI of the subject node. If the expected value of the system metric exceeds the threshold, the process 200 proceeds to step 210. Otherwise, the process 200 returns to step 202.

At step 210, a remediation action is taken to prevent the system metric from reaching the predicted value, and thus prevent the subject node from entering an undesired state. The remediation action may include any of the remediation actions discussed above with respect to FIGS. 1A-C. As noted above, the remediation may include automatically reconfiguring the subject node or outputting a notification for presentation to a system administrator.

At step 212, the linear predictor model executed at step 206 is updated in a well-known fashion based on the accuracy of past predictions made by the model. Updating the linear predictor module may include recalculating one of the weights w based on whether past predictions made by the model are correct. The present disclosure is not limited to any specific technique for online-update of the linear predictor model.

Figure 3:
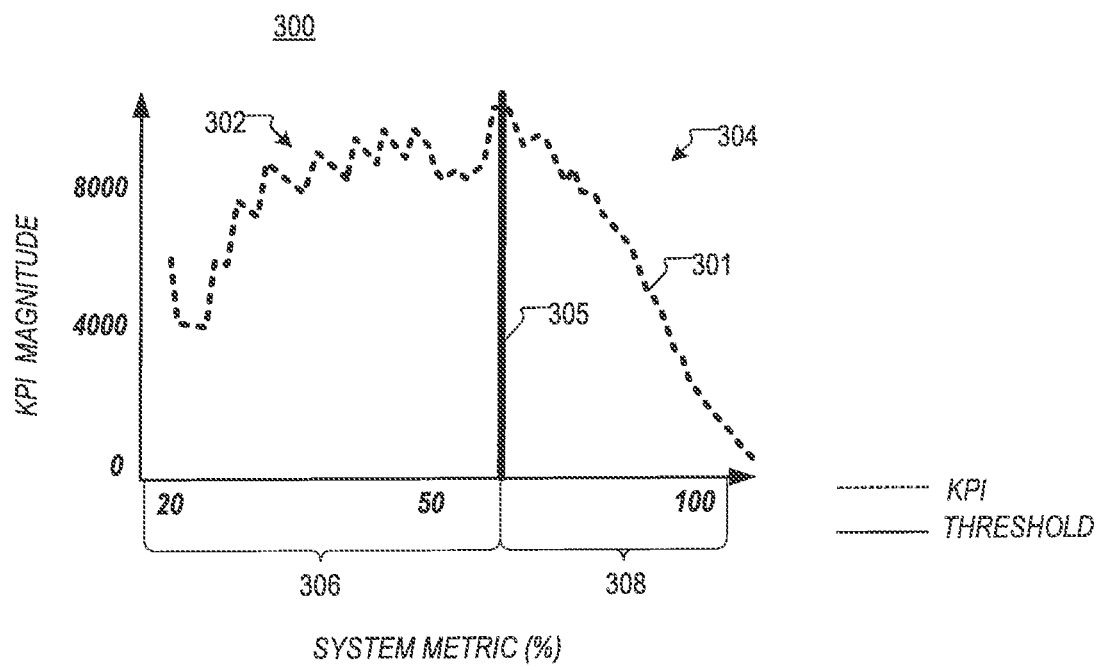
FIG. 3 is a plot illustrating an association between the values of a system metric and the values of a KPI of a computing device, according to aspects of the disclosure.

FIG. 3 shows a plot 300 of an association 301 between signals within the subject node (discussed with respect to FIG. 1) and the state of the subject node. As illustrated, the association 301 may map each of a plurality of values of the system metric of the subject node (e.g., the system metric discussed with respect to step 202) to a different respective value of a KPI of the subject node. A threshold 305 may be calculated based on the association, such that the threshold 305 maximizes a difference between a mean of KPI values above the threshold and a mean of KPI values below the threshold. According to the present example, the KPI values below the threshold may include any of the KPI values that are plotted in region 302 of the plot 300, and the KPI values above the threshold may include any of the KPI values that are plotted in region 304 of the plot 300. In some implementations, each of the KPI values below the threshold 305 may be associated with a set 306 of values of the system metric and each of the KPI values above the threshold may be associated with a set 308 of values of the system metric, wherein any of the values in the set 306 is smaller than each of the values in the set 308.

As can be readily appreciated, myriad hardware system metrics may contribute to system performance with respect to any particular system performance KPI. Linear correlation metrics often fail to show relationships between system parameters (e.g., RAM usage) and system KPIs because of the large number of system parameters that drive the KPI. To overcome this challenge, the relationship between the KPI and the system metrics may be framed as a non-linear relationship. The threshold 305 may be selected based on this non-linear relationship. As noted above, the threshold 305 may be selected such that it maximizes the difference of mean KPI values above and below the threshold 305, In some implementations, the threshold 305 may be calculated using Equation 3 below:

$$O_t = \max_i((\bar{x}t_a^i - \bar{x}t_b^i)C(xt_a^i)) \forall t^i \text{in} T \quad \text{(Eq. 3)}$$

where $O_t$ is the threshold, T is the set of possible i thresholds, $\bar{x}t_a^i$ is the average of all KPI values above the threshold, $\bar{x}t_b^i$ is the average of all KPI values below the threshold, and $C(xt_a^i)$ is the count of all KPI values above the threshold. Calculating the threshold in this manner is advantageous because it allows models to be used that predict if optimal thresholds will be exceeded, allowing for remediation prior to performance degradation. Furthermore, calculating thresholds in this manner may allow the current state of the subject node to be defined and summarized by the state of one or more hardware metrics, with respect to Whether the hardware metric is above or below the calculated threshold.

Figure 4:
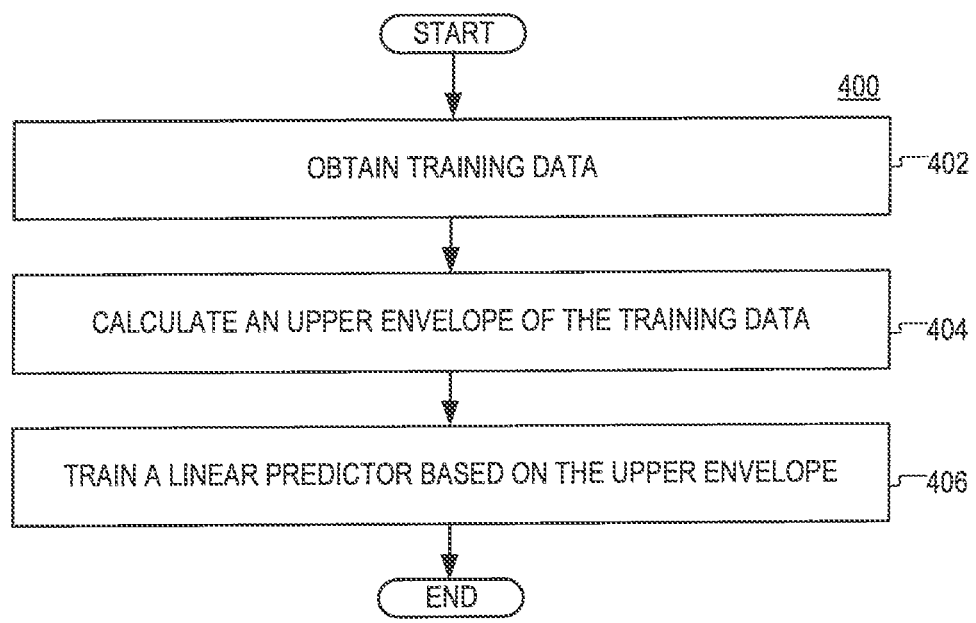
FIG. 4 is a flowchart of an example of a process, according to aspects of the disclosure.

FIG. 4 shows an example of a process 400 for training a linear predictor, according to aspects of the disclosure. As discussed above with respect to FIG. 2, the process 400 may be used to train the linear predictor used at step 206 of the process 200.

At step 402, a set of training data is obtained. In some implementations, the training data set may be obtained from one or more logs (e.g., Splunk logs, VM logs, etc.) that are generated within the system 100. The logs may include error logs, execution trace logs, and/or any other suitable type of log. The logs may be generated by the same node 110 in the system 100 or by different nodes 110 in the system 100. In some implementations, the training data may include time-series data. More particularly, the training data may include a plurality of values of the system metric that are collected over a given time period. Furthermore, in some implementations, the raw training data may be unevenly-sampled. That is, the values of the system metric, which constitute the training data, may be sampled at uneven time intervals. According to the present disclosure, the set of training data may be unevenly-sampled when at least two values in the set are sampled at different time intervals. Although in the present disclosure the training data set is unevenly-sampled, alternative implementations are possible when the set is evenly sampled.

Figure 5:
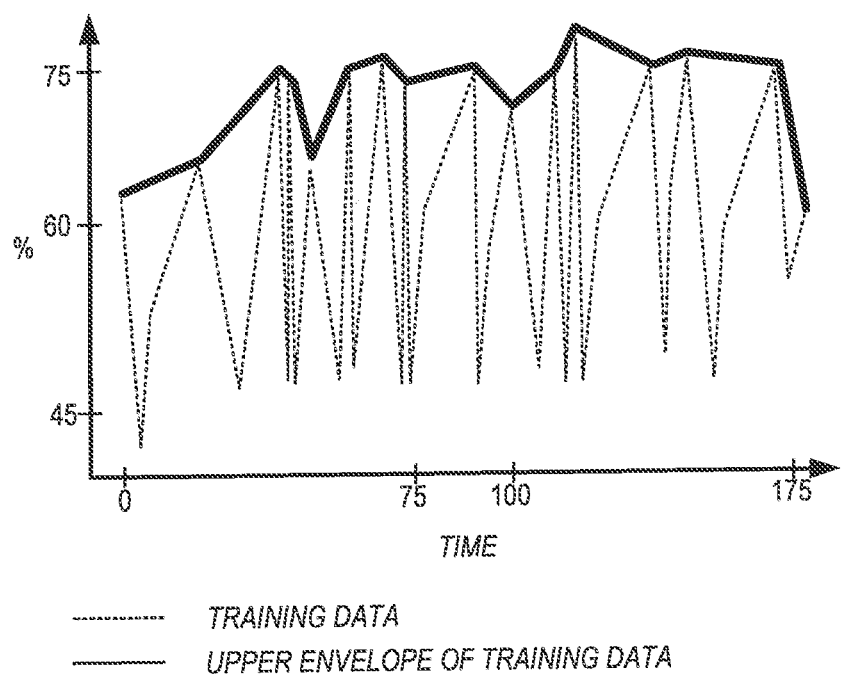
FIG. 5 is a plot of a training data set and an upper envelope of the training data set, according to aspects of the disclosure.

At step 404, an upper envelope of the training data is calculated. As illustrated in FIG. 5, calculating the upper envelope may include one or more of: (i) identifying a plurality of maxima of the training data, and (ii) calculating a fitted curve based on the maxima. In some implementations, the upper envelope may include the value of any of the maxima of the training data. Additionally or alternatively, the upper envelope may include any value of the function representing the fitted curve.

At step 406, the linear predictor used at step 206 is trained by using the upper envelope of the training data as the training data set. The present disclosure is not limited to any specific technique for training a linear predictor based on the upper envelope. In some respects, training the linear predictor based on the upper envelope of the training data may help increase the accuracy of the linear predictor, in comparison to linear predictors that are trained directly with the training data. Using the upper envelope to train the linear predictor may help soften adverse effects which high variance and/or uneven sampling of the training data may have on the accuracy of the linear predictor.

According to aspects of the disclosure, in order for the linear predictor to be robust against infrequently sampled data and the periodic nature of hardware performance data, the process 400 determines the upper envelope of the training data to use for feature extraction. The upper envelope of the training data provides more relevant information relative to the threshold 305, as the mean of a periodic signal would always be further from the threshold than the upper envelope. The upper envelope, therefore, contains more useful information relative to the threshold and provides better algorithm performance. The features extracted from the upper envelope of raw training data (e.g., slope, intercept) can be more useful with respect to accurately predict the value of a system metric than features extracted directly from the raw training data.

Figure 6:
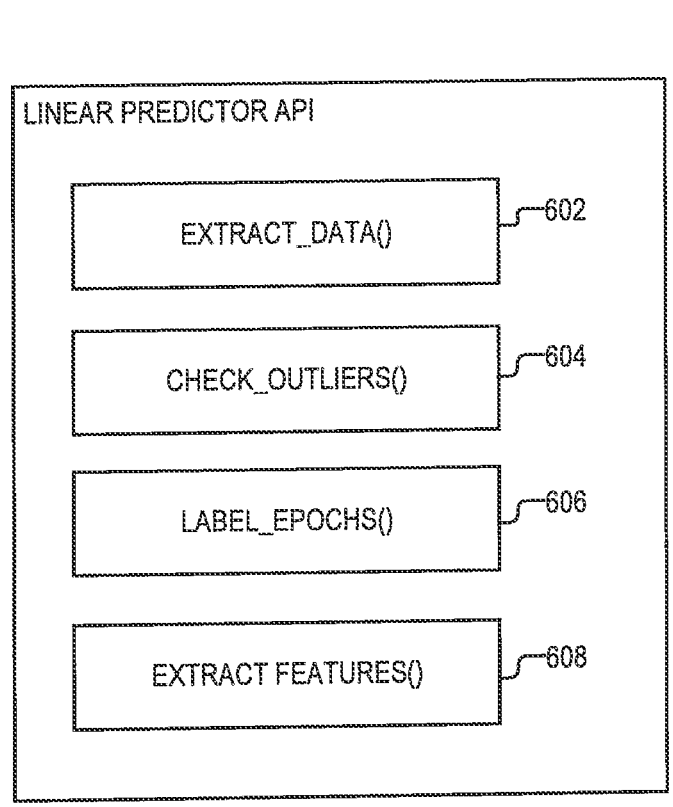
FIG. 6 is a schematic diagram of an Application Programming Interface (API), according to aspects of the disclosure.

FIG. 6 shows an example of an Application Programming Interface (API) 600 that may perform at least some of the operations associated training and using a linear predictor, as discussed above with respect to FIGS. 2 and 4. The API 600 may be executed by the system manager 120 and/or any other node in the system 100. The API 600 may be configured to remove outliers in unevenly sampled time series data, perform feature extraction from sampled time series data, automatically generate class labels for online learning, and generate visualizations for user monitoring or processing. In some implementations, the API 600 may include methods 602-608. Method 602 (EXTRACT_DATA) may be configured to extract numerical data from system logs text (e.g., Splunk logs). For example, some system logs may contain the values for multiple metrics, Such logs are herein referred to as "mixed logs." When method 602 is executed using a mixed log as an input parameter, method 602 may return the values for only one of the metrics in the log as its output. In other words, method 602 may be configured to extract values of a system metric from a system log for further processing. Method 604 (CHECK_OUTLIERS) may be configured to transform and normalize values provided by method 602 to approximate a Gaussian distribution. Method 604 may be used to detect outliers in the set of system metric values provided by method 602. Method 606 (LABEL_EPOCHS) may be configured to capture subject-matter expert (SME) knowledge by automatically labeling new data for ongoing model training, such as the training conducted at step 212 of process 200. Method 608 (EXTRACT_FEATURES) may be configured to transform raw input data to its upper envelope representation and extract features from the new data representation. In some implementations, method 608 may be used to execute, at least in part, steps 404 and 406 of the process 400.

Figure 7:
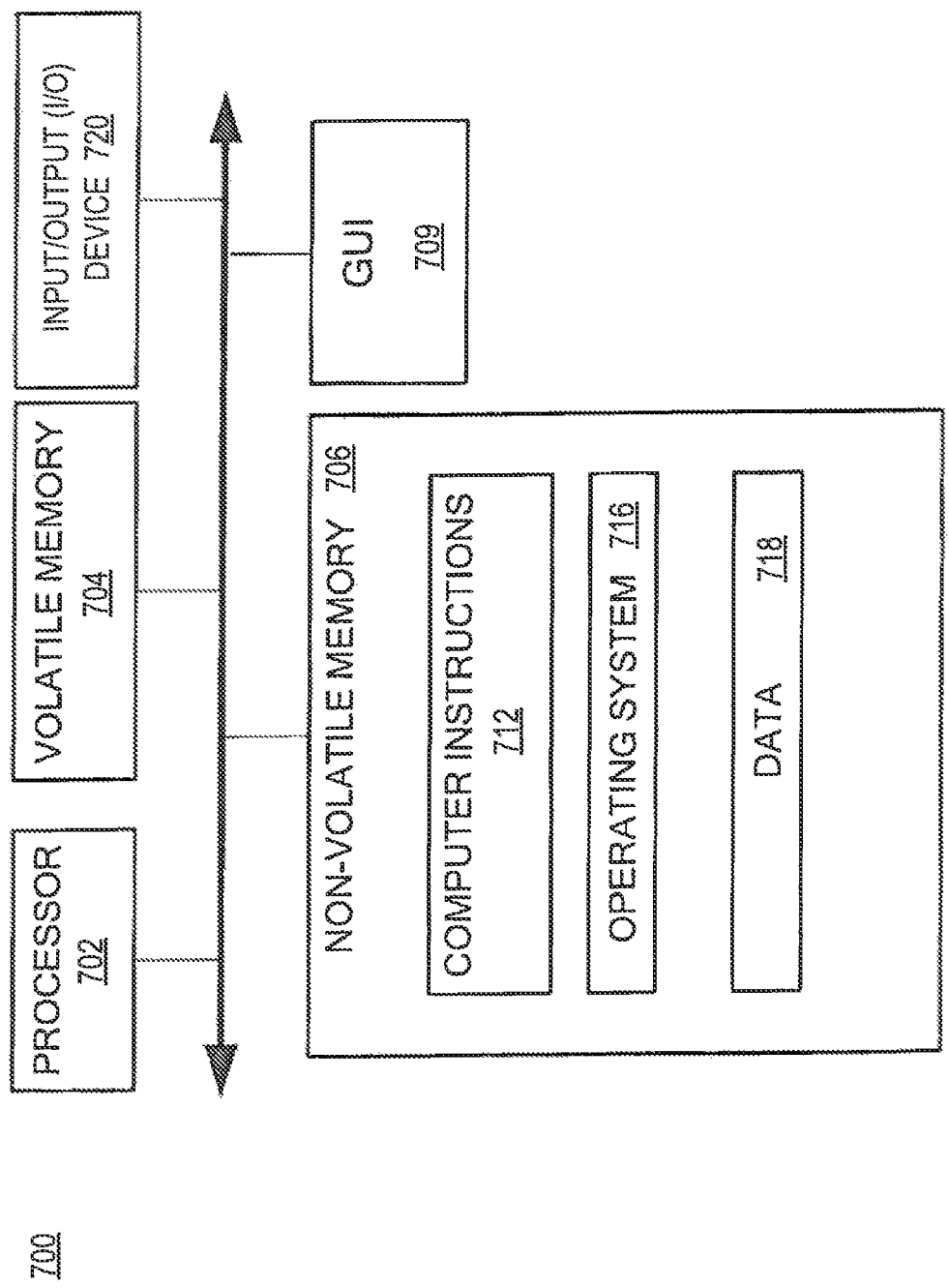
FIG. 7 is a diagram of an example of a computing device, according to aspects of the disclosure.

FIG. 7 is a diagram of an example of a computing device 700, according to aspects of the disclosure. Computing device 700 may include processor 702, volatile memory 704 (e.g., RAM), non-volatile memory 706 (e.g., a hard disk drive, a solid state drive such as a flash drive, a hybrid magnetic and solid state drive, etc.), graphical user interface (GUI) 709 (e.g., a touchscreen, a display, and so forth) and input/output (I/O) device 720 (e.g., a mouse, a keyboard, etc.). Non-volatile memory 706 stores computer instructions 712, an operating system 716 and data 718 such that, for example, the computer instructions 712 are executed by the processor 702 out of volatile memory 704 to perform at least a portion of the operations discussed above with respect to FIGS. 1A-6, Program code may be applied to data entered using an input device of GUI 709 or received from I/O device 720.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a genera-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments. In the example of FIG. 2, a predicted value of a system metric is calculated only when the system metric approaches a threshold, in order to conserve system resources. However, in implementations where CPU time and other system resources are not an issue, the predicted value of the system resource can be calculated periodically and/or continuously. Although in the example of FIG. 4, a linear predictor is trained based on an upper envelope of training data, alternative implementations are possible when the linear predictor is trained on the lower envelope of the training data.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
obtaining one or more values of a system metric, the system metric being associated with a hardware resource of a computing device;
detecting whether the system metric is approaching a threshold, the threshold being associated with a key performance indicator (KPI) of the computing device, the detecting being performed based on the obtained values of the system metric;
calculating a predicted value of the system metric in response to detecting that the system metric is approaching the threshold, the predicted value of the system metric being calculated by using a linear predictor that is trained based on an upper envelope of unevenly-sampled training data, the upper envelope including any value of a function that is fitted over maxima of the unevenly-sampled training data;
detecting whether the predicted value of the system metric exceeds the threshold; and
reconfiguring the computing device to prevent the system metric from reaching the predicted value in response to detecting that the predicted value exceeds the threshold.

2. The method of claim 1, further comprising:
receiving the unevenly-sampled training data; and
calculating the upper envelope of the unevenly-sampled training data.

3. The method of claim 1, wherein:
the unevenly-sampled training data is obtained from one or more logs that are generated at least in part by the computing device, and
the KPI of the computing device includes response time of at least one thread that is executed on the computing device.

4. The method of claim 1, further comprising calculating the threshold based on a model that maps each of a plurality of values of the system metric to a respective value of the KPI, such that the threshold maximizes a difference between a mean of KPI values above the threshold and a mean of KPI values below the threshold.

5. The method of claim 1, wherein the linear predictor includes a Stochastic Gradient Descent model.

6. The method of claim 1, wherein the hardware resource includes random-access memory (RAM) of the computing device, and reconfiguring the computing device includes restarting the computing device.

7. The method of claim 1, wherein the hardware resource includes non-volatile memory of the computing device, and reconfiguring the computing device includes copying data stored in the non-volatile memory of the computing device to another computing device.

8. A system comprising:
a memory; and
at least one processor operatively coupled to the memory, the at least one processor being configured to perform the operations of:

obtaining one or more values of a system metric, the system metric being associated with a hardware resource of a computing device;

detecting whether the system metric is approaching a threshold, the threshold being associated with a key performance indicator (KPI) of the computing device, the detecting being performed based on the obtained values of the system metric;

calculating a predicted value of the system metric in response to detecting that the system metric is approaching the threshold, the predicted value of the system metric being calculated by using a linear predictor that is trained based on an upper envelope of unevenly-sampled training data the upper envelope including any value of a function that is fitted over maxima of the unevenly-sampled training data;

detecting whether the predicted value of the system metric exceeds the threshold; and reconfiguring the computing device to prevent the system metric from reaching the predicted value in response to detecting that the predicted value exceeds the threshold.

9. The system of claim 8, wherein the at least one processor is further configured to perform the operations of:
receiving the unevenly-sampled training data; and
calculating the upper envelope of the unevenly-sampled training data.

10. The system of claim 8, wherein:
the unevenly-sampled training data is obtained from one or more logs that are generated at least in part by the computing device, and
the KPI of the computing device includes response time of at least one thread that is executed on the computing device.

11. The system of claim 8, wherein the at least one processor is further configured to perform the operation of calculating the threshold based on a model that maps each of a plurality of values of the system metric to a respective value of the KPI, such that the threshold maximizes a difference between a mean of KPI values above the threshold and a mean of KPI values below the threshold.

12. The system of claim 8, wherein the linear predictor includes a Stochastic Gradient Descent model.

13. The system of claim 8, wherein the hardware resource includes random-access memory (RAM) of the computing device, and reconfiguring the computing device includes restarting the computing device.

14. The system of claim 8, wherein the hardware resource includes non-volatile memory of the computing device, and reconfiguring the computing device includes copying data stored in the non-volatile memory of the computing device to another computing device.

15. A non-transitory computer-readable medium storing one or more processor-executable instructions which when executed by at least one processor cause the at least one processor to perform the operations of:

obtaining one or more values of a system metric, the system metric being associated with a hardware resource of a computing device;

detecting whether the system metric is approaching a threshold, the threshold being associated with a key performance indicator (KPI) of the computing device, the detecting being performed based on the obtained values of the system metric;

calculating a predicted value of the system metric in response to detecting that the system metric is approaching the threshold, the predicted value of the system metric being calculated by using a linear predictor that is trained based on an upper envelope of unevenly-sampled training data, the upper envelope including any value of a function that is fitted over maxima of the unevenly-sampled training data;

detecting whether the predicted value of the system metric exceeds the threshold; and reconfiguring the computing device to prevent the system metric from reaching the predicted value in response to detecting that the predicted value exceeds the threshold.

16. The non-transitory computer-readable medium of claim 15, wherein the one or more processor-executable instructions, when executed, further cause the at least one processor to perform the operations of:
receiving the unevenly-sampled training data; and
calculating the upper envelope of the unevenly-sampled training data.

17. The non-transitory computer-readable medium of claim 15, wherein:
the unevenly-sampled training data is obtained from one or more logs that are generated at least in part by the computing device, and
the KPI of the computing device includes response time of at least one thread that is executed on the computing device.

18. The non-transitory computer-readable medium of claim 15, further comprising calculating the threshold based on a model that maps each of a plurality of values of the system metric to a respective value of the KPI, such that the threshold maximizes a difference between a mean of KPI values above the threshold and a mean of KPI values below the threshold.

19. The non-transitory computer-readable medium of claim 15, wherein the linear predictor includes a Stochastic Gradient Descent model.

20. The non-transitory computer-readable medium of claim 15, wherein the hardware resource includes random-access memory (RAM) of the computing device, and reconfiguring the computing device includes restarting the computing device.

* * * * *